United States Patent Office 3,154,195
Patented Oct. 27, 1964

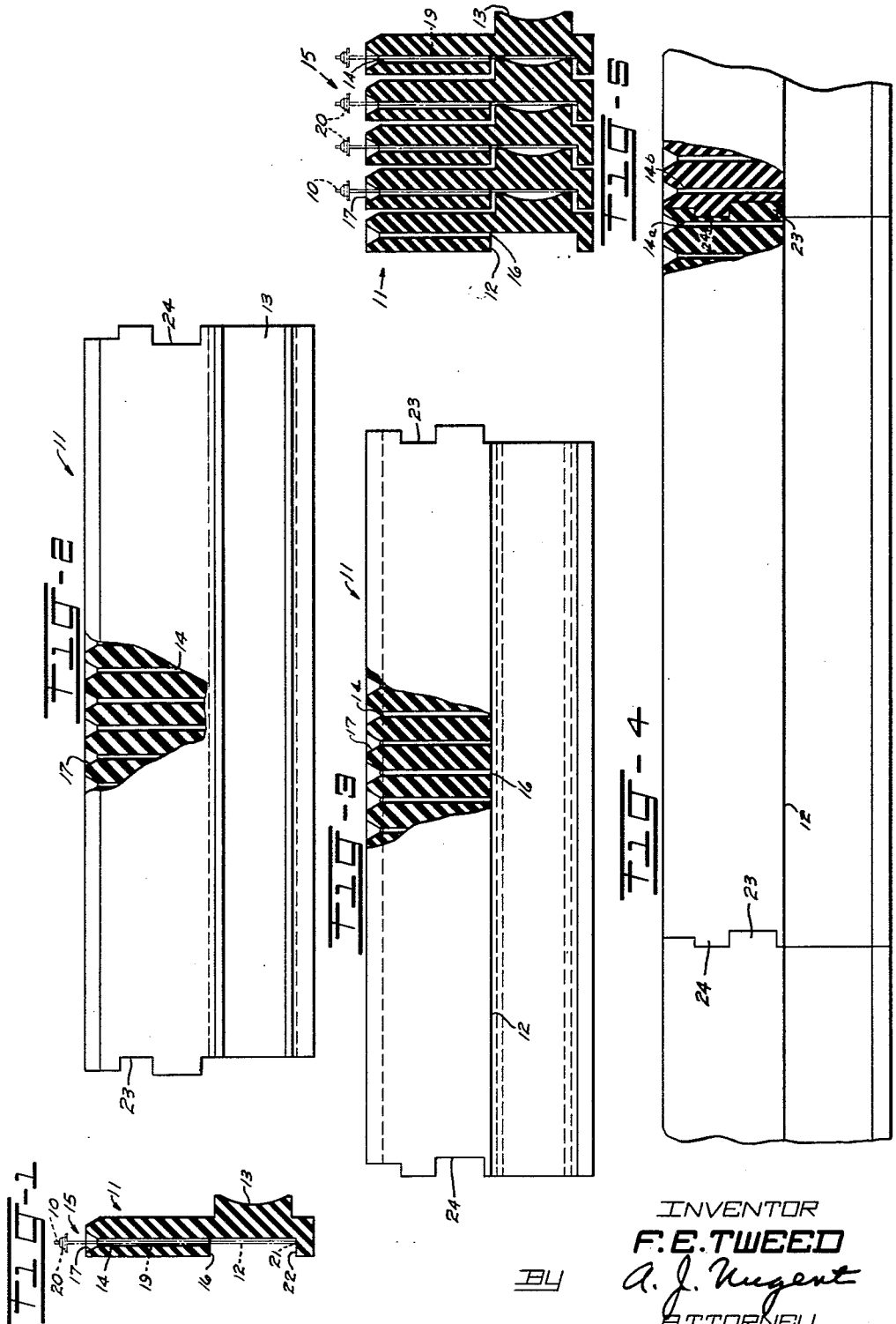

3,154,195
MATERIALS HANDLING RACK
Francis E. Tweed, Reading, Pa., assignor to Western Electric Company Incorporated, New York, N.Y., a corporation of New York
Filed Mar. 29, 1963, Ser. No. 268,896
12 Claims. (Cl. 211—69)

This invention relates to a novel materials handling rack and, particularly but not necessarily exclusively, to a rack of this nature which is peculiarly adapted to incorporation in a substantially automated manufacturing process.

Many manufacturing processes, as for example those employed in the manufacture of various electrical articles, require that the completed articles and/or the component parts thereof be supported in an equally spaced manner and without surface contact therebetween while subjected in large quantities to a plurality of differently located successive manufacturing operations. Automation of such processes requires the provision of article handling means, compatible in both the structural and functional senses with the operational requirements of the processes, whereby the articles may be separately supported in the said equally spaced manner and transported by the means between and through the said successive manufacturing operations in quantities commensurate with the maximum rate at which the operations may be effectively performed thereon. Further, since the operational requirements of the processes may necessitate the inversion or other positioning of the article handling means, it is essential that provision be made to guarantee the retention of the articles supported therein during such positioning thereof.

It is, accordingly, an object of the invention to provide an effective materials handling rack whereby a plurality of articles may be supported therein in an equally spaced manner without surface contact therebetween.

Another object of the invention is the provision of a rack as above whereby articles may be securely supported and maintained therein notwithstanding the inversion or other positioning of the rack.

A further object of the invention is the provision of a rack as above which is peculiarly adaptable to incorporation in a substantially automated, multi-operation manufacturing process.

In a preferred embodiment herein disclosed, the rack will be seen to be designed for the handling of single-lead electrical or similar articles, and to comprise a generally slab-shaped member with a plurality of equally spaced article mounting holes formed therein. Complementary means are provided on the sides of the rack whereby a plurality of racks may be clamped together in a side-by-side relationship to securely support and maintain articles in fixed relation during inversion or other extreme positioning of the racks. Additional complementary shaped tongue and groove means are formed in the ends of the racks and are so dimensioned that a plurality of the racks may be placed together in an interlocked, end-to-end relationship while maintaining the quality of spacing between all adjacent article mounting holes in the racks.

The above and other objects and advantages of the invention are believed made clear by the following detailed description taken in conjunction with the accompanying drawings wherein:

FIG. 1 is an end cross-sectional view of the rack of the invention;
FIG. 2 is a side plan view of one side of the rack;
FIG. 3 is a side plan view of the other side of the rack;
FIG. 4 is a side plan view of a plurality of the racks placed in interlocked end-to-end relationship, and FIG. 5 is an end cross-sectional view of a plurality of the racks placed in interlocked, side-by-side relationship.

Turning now to FIGS. 1, 2 and 3 of the drawings, the rack will be seen to consist of a generally slab-shaped member 11 comprising groove 12 and complementary shaped tongue 13 formed as shown and extending the entire lengths of opposite sides thereof for purposes described in detail hereinbelow.

A plurality of equally spaced article mounting holes 14 (24 in number in the herein-disclosed preferred embodiment) extend from the upper surface of the rack into communication with the interior of the groove at 16. The holes are countersunk as shown at 17 whereby articles may be conveniently inserted therein for support within the racks. For convenience of description, a diode stud assembly, generally indicated at 18, is depicted in FIGS. 1 and 5 in the position assumed thereby within the rack. The stud assembly comprises a lead wire 19, stud portion 20 and internal whisker 10 attached thereto. The stud lead wire 19 will be seen to extend through hole 14 into the interior of groove 12 and to be supported within the rack by the abutment of the lower end surface 21 of the lead wire with the lower surface 22 of the groove. The thusly supported stud assembly will further be seen to extend sufficiently above the upper surface of the rack to enable the convenient removal of the assembly from the rack, or the convenient subjection of the projecting portion thereof to various manufacturing processes.

The end of the rack will be seen in FIGS. 2, 3 and 4 to also comprise complementary tongue and groove configurations 23 and 24, respectively, whereby a plurality of the racks may be placed in interlocked end-to-end relationship in the manner depicted in FIG. 4. It is essential to a preferred function of the herein-disclosed embodiment that the spacing between holes 14a and 14b in adjacent interlocked racks equal the spacing between any two adjacent holes of a single rack so that the equality of spacing between all adjacent articles supported within the plurality of racks be maintained. Thus, a plurality of the article-bearing racks may be positioned in the depicted interlocked, end-to-end relationship and fed automatically, as for example by the use of a guide and rail system, to an article processing machine, the operational characteristics of which require an equality of spacing between all adjacent articles fed thereto.

Clamping of a large plurality of the article-bearing racks in side-by-side relationship and subsequent inversion or other extreme positioning of the racks without any of the articles falling therefrom under the force of gravity is made possible by the complementary shapes of groove 12 and tongue 13. Thus, a plurality of racks may be clamped together in the manner of FIG. 5 whereby the tongue 13 of one rack projects into the groove 12 of the adjacent rack to effectively clamp the exposed portions of lead wires 19 securely therewithin. In this regard, it is to be noted that no bending of the lead wires results from this clamping since the lead wire 19 assumes a flat position against the aligned groove and hole surfaces in the manner depicted in the subject figure. The leftmost of this plurality of racks is depicted as empty since there is no rack adjacent thereto which can function to clamp articles therewithin during inversion of the racks. Alternatively, a clamping means incorporating a tongue similar to complementary shaped tongue 13 to project into groove 12 of this rack might be employed, whereby articles could, of course, be effectively supported therewithin during inversion of the racks.

A wide variety of suitable materials will find application in the manufacture of the racks. For example only, Teflon has proven quite satisfactory in this regard in applications wherein resistance to chemicals in the nature of cleaning or etching solutions is required, while aluminum would appear preferable in those applications wherein the racks will be subjected to elevated temperatures. Further, the use of a relatively inert material, as for example a ceramic or similar compound, embodying satisfactory tensile strength in addition to a natural resistance to both chemical action and elevated temperatures, would be of interest in the provision of racks suitable for use throughout an entire manufacturing process wherein both chemical action and elevated temperatures would be encountered thereby.

One manner in which the herein-disclosed preferred embodiment of the rack may find effective utilization is believed made clear by the following exemplary description of the use thereof in conjunction with a substantially automated, multi-operation, manufacturing process currently employed in the manufacture of diodes of the type depicted in the drawings. It is to be noted here that the materials handling tray which forms the subject matter of my copending application, Serial No. 270,682, has proven particularly effective in the handling of the racks at various stages in the subject multi-operation process, and in the provision of means to enable the convenient storage thereof.

Upon the welding of the diode leads 19 to the diode studs 20, the diode stud assemblies are automatically inserted in Teflon racks and cleaned by the spraying thereof with a solvent solution. The Teflon racks containing the thusly cleaned stud assemblies are then fed in turn to a gold bonding and wafer and internal whisker attachment machine, specifically designed for the receipt and handling thereof, wherein the stud assemblies are automatically removed from the racks, the wafers and internal whiskers attached thereto, and the now substantially completed diode subassemblies automatically reinserted in the racks.

Thirty of the racks are then clamped together in the side-by-side manner depicted in FIG. 5 and inverted in the vicinity of an etching solution whereby only the protruding stud portions of the diode subassemblies are submerged therein. The racks are next returned to an upright position and the subassemblies removed therefrom and placed in aluminum racks for exposure to the elevated temperatures of a drying oven, and subsequently fed to an assembly machine—again specifically designed for the receipt and handling thereof—wherein protective can-shaped covers are automatically attached over the protruding stud portions.

Removal of the diodes from the aluminum racks and the transfer thereof back to the Teflon racks follows whereupon thirty of the loaded racks are again clamped together in the manner of FIG. 5 and inverted in the vicinity of a gold plating solution to submerge therewithin and gold plate only the protruding can-shaped cover portions of the diodes, at the completion of which process the racks are returned to an upright position. The diode-bearing racks may then be collected for storage, or fed directly to an automatic packaging machine designed for the receipt and handling thereof wherein the diodes may be automatically removed therefrom and packaged for shipment. Alternatively, the Teflon racks bearing the completed diodes may at this point be fed to electrical testing apparatus wherein the diodes may be tested in situ by employing bus bar means to establish a common contact with the portions of the leads 19 exposed within the groove 12. Thus, it may be readily appreciated that the herein-disclosed embodiment of my invention provides an effective materials handling means whereby substantial automation of a compatible, multi-operation manufacturing process is made possible through the use thereof.

Although I have described the herein-disclosed preferred embodiment of my invention in detail, it will readily become obvious to those skilled in this art, after reading this description, that various changes and modifications may be made therein without departing from the spirit and scope thereof. It is, therefore, intended that the matter contained in the foregoing description and annexed drawings be interpreted as illustrative only, and not in a limiting sense, when consideration is given to the appended claims.

What is claimed is:

1. In an article handling means:
    a generally slab-shaped member,
    a groove formed in one side surface thereof,
    a complementary shaped tongue formed on an opposite side surface thereof, and
    a plurality of article mounting holes formed in the slab and extending therewithin from the top surface thereof to the interior of the groove whereby articles inserted therein will extend into the interior of the groove and may be maintained therein upon inversion or other extreme positioning of the rack by the clamping action of the complementary shaped tongue of an identical member clamped thereagainst in side-by-side relationship.

2. In an article handling means as in claim 1 wherein:
    the article mounting holes are countersunk at the top surface of the slab to enable the convenient insertion of articles therein, and
    the said holes are equally spaced to maintain an equality of spacing between articles supported therewithin.

3. In an article handling means as in claim 1 wherein:
    an additional complementary shaped tongue and groove means formed at opposite ends of the said member whereby a plurality of the members may be positioned in interlocked end-to-end relationship.

4. In an article handling rack:
    a generally slab-shaped member,
    a groove formed in one side surface of the member,
    a complementary shaped tongue formed on an opposite side surface of the member,
    a plurality of equally spaced and countersunk article mounting holes formed in the member and extending therewithin from the top surface thereof to the interior of the said groove whereby articles inserted therein will extend into the interior of the groove and may be maintained therewithin during inversion or other extreme positioning of the member by the clamping action of the complementary shaped tongue of an identical member clamped thereagainst in side-by-side relationship, and
    additional complementary shaped tongue and groove means formed at opposite ends of the said member whereby a plurality of the members may be positioned in an interlocked end-to-end relationship.

5. In a rack as in claim 4 wherein:
    the additional complementary shaped tongue and groove means formed in the opposite ends of the member are dimensioned to maintain the equality of spacing between all adjacent holes when a plurality of the members are placed in the said interlocked end-to-end relationship.

6. In a device as in claim 4 wherein:
    the member is made of Teflon.

7. In a device as in claim 4 wherein:
    the member is made of aluminum.

8. In a device as in claim 4 wherein:
    the member is made of a ceramic material.

9. In an article handling rack for use in the manufacture of diodes:
    a generally slab-shaped member,
    a groove formed in one side surface of the member and extending the entire length thereof,
    a complementary shaped tongue formed on an opposite side surface of the member and extending the entire length thereof,
    a plurality of equally spaced and countersunk diode mounting holes formed in the top surface of the member and extending therefrom to the interior of the groove whereby diode lead wires inserted therein will extend into the interior of the groove and may be maintained therein during inversion or other extreme positioning of the member by the clamping action of the complementary shaped tongue of an identical member clamped thereagainst in side-by-side relationship with the tongue of the latter projecting into the said groove, and additional complementary shaped tongue and groove means formed at opposite ends of the said member whereby the member may be placed in interlocked end-to-end relationship with a plurality of members identical thereto, said further complementary shaped tongue and groove means being so dimensioned as to maintain the equality of spacing between all adjacent holes when the said member is placed in the said interlocked end-to-end relationship with a plurality of identical members.

10. In an article handling rack as in claim 9 wherein: the member is made of Teflon.

11. In an article handling rack as in claim 9 wherein: the member is made of aluminum.

12. In an article handling rack as in claim 9 wherein: the member is made of a ceramic material.

References Cited in the file of this patent

UNITED STATES PATENTS

| | | |
|---|---|---|
| 2,941,662 | Osberg | June 21, 1960 |
| 3,008,581 | Kohler | Nov. 14, 1961 |

FOREIGN PATENTS

| | | |
|---|---|---|
| 889,351 | Germany | of 1953 |